3,582,510
FLAME-RETARDANT COMPOSITIONS FOR PLASTICS

Joseph Frederick Cannelongo, Piscataway, N.J., assignor to American Cyanamid Company, Stamford, Conn.
No Drawing. Continuation-in-part of abandoned application Ser. No. 525,860, Feb. 8, 1966. This application Nov. 5, 1968, Ser. No. 773,661
Int. Cl. C08f 45/56; C08g 51/56
U.S. Cl. 260—28.5      10 Claims

ABSTRACT OF THE DISCLOSURE

Flame-retardant compositions comprising a synergistic combination of a chlorinated hydrocarbon and a phosphinic acid and thermoplastic polymers flame-retarded therewith, are disclosed.

CROSS-REFERENCE TO RELATED APPLICATIONS

This application is a continuation-in-part of my copending application, Ser. No. 525,860, filed Feb. 8, 1966 and now abandoned.

BACKGROUND OF THE INVENTION

The use of certain additives for the purpose of reducing the flammability of various thermoplastic polymers is well known to those skilled in the art. Among the additives currently employed for such a use are various specific types of phosphorus-containing compounds. These phosphorus compounds are generally used either alone or in combination with other materials such as aliphatic or aromatic antimonous compounds. Certain analogous materials such as chlorostyrene copolymers, chlorinated paraffin waxes, alone or with antimony oxides, are also known to be effective flame-retardants for resinous materials. One drawback of these known compounds and combinations of compounds, however, has been the fact that generally large amounts, i.e. upwards of 35% of the additive must be incorporated into the polymer in order to render it reasonably flame-retardant. Such large quantities of additive ofttimes deleteriously alter the properties of the polymer and moreover, some additives tend to crystallize or oil out of the polymer after a relatively short time of incorporation therein.

I have now found that superior flame-retarding properties can be imparted to thermoplastic polymers by incorporating into the polymers a synergistic combination or mixture of a chlorinated hydrocarbon material and a phosphinic acid. The novel synergistic combination is utilized at a total concentration which is less than the amounts at which either component may function independently in a manner similar to the combination in the same polymer to which the combination is added.

The results shown by the use of the above-mentioned flame-retardant combination are surprising and unexpected in that the combination provides a greater degree of flame-retardancy than one would expect from the results shown by the use of the components individually, i.e. they are synthergistic. Additionally, the effectiveness of the combination is achieved in the absence of any third ingredient, such an antimony compounds which were believed to be necessary additives. This synergism, moreover, does not appear to be limited to specific combinations, but is broadly applicable to any combination of a chlorinated hydrocarbon material and a phosphinic acid as defined hereinbelow.

As mentioned above, the first critical component of my novel flame-retardant compositions is a chlorinated hydrocarbon material. Although any chlorinated hydrocarbon material tends, to some extent, to be effective, I have found that those which are stable to the processing conditions of thermoplastic polymers when in combination therewith are more preferable. That is to say, a critical limitation in regard to the chlorinated hydrocarbon materials is that they should have a boiling point of at least about 200° C., in that those of a lower boiling point tend to vaporize out of the polymer when the polymer is ultimately processed or fabricated for consumer production.

A further critical limitation in regard to the chlorinated hydrocarbon materials utilized herein is that they must contain at least about 40% of combined chlorine, preferably from about 40% to 80%, by weight, based on the weight of the compound per se. Percentages of combined chlorine above 80% are tolerable but impractical, while at percentages lower than about 40%, the effectiveness of the combination is materially lowered. The chlorinated hydrocarbon material may be used in concentrations ranging from about 0.2% to about 15.0%, by weight, based on the weight of the polymer to which it is added, preferably from about 0.5% to about 12.0%, same basis.

Examples of useful chlorinated hydrocarbon materials include compounds such as perchloropentacyclodecane, hexachlorocyclopentadiene, hexachlorobenzene; the polychlorinated monocyclic aromatic hydrocarbons such as 2,3,5,6-tetrachloro-o, m or p-xylene, 2,5-dichloro-o, m or p-xylene, $\alpha,\alpha$-dichloro-o, m or p-xylene, $\alpha,\alpha^1$-hexachloro-o, m or p-xylene; various commercially available chlorinated biphenyls and polyphenyls which range in consistency from oily liquids to fine, white crystals to hard, transparent resins. These biphenyls and polyphenyls are non-oxidizing, have a low volatility and are non-corrosive. They are not hydrolyzed by water, alkalies or acids, are insoluble in water, glycerine and glycols and distill at 215° C. to 450° C. The crystalline materials have melting points up to 290° C. and the resins have softening points up to 105° C.

A further class of applicable chlorinated hydrocarbon materials useful herein are the chlorinated paraffin waxes containing between about 40% to 80% combined chlorine and averaging from 18–36 carbon atoms. These materials are chlorinated soft or slack waxes and are set forth in one or more of the following U.S. Pat. Nos. 2,924,532, 2,962,464 and 3,194,846, which patents are hereby incorporated herein by reference.

The second critical component of my novel flame-retardant compositions is a phosphinic acid having the formula (I) 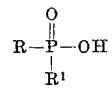

wherein R is an aryl ($C_6$–$C_{10}$), alkyl ($C_1$–$C_8$), aralkyl ($C_7$–$C_{11}$), cyanoalkyl ($C_3$–$C_4$), hydroxyalkyl ($C_1$–$C_6$), haloalkyl ($C_1$–$C_6$), carboxyalkyl ($C_3$–$C_4$), or carboxyhydroxyalkyl ($C_3$–$C_6$) radical and $R^1$ is hydrogen or R.

These acids may be produced by any known procedure, one of which is disclosed in U.S. Patent. No. 2,953,-595, and others which are taught in Kosolapoff, Organophosphorous Compounds, John Wiley and Sons, New York, N.Y., Publishers, p. 129 et seq. 1950, which publications are hereby incorporated herein by reference.

The phosphinic acid may be incorporated into the polymeric material in concentrations ranging from about 0.1% to about 15.0%, preferably, 0.2%–12.0%, by weight, based on the weight of the polymer to which it is added.

The terms "aryl radical and aralkyl radical," as used herein in regard to the substitutents R and $R^1$ of Formula I, above, are meant to include not only carbon-hydrogen cyclic compounds but also lower alkyl, halogen, hydroxy and cyano ring-substituted cyclic compounds and the scope of the instant invention should be construed so as to include compounds falling within this definition.

Examples of phosphinic acids which may be used according to the instant invention include phenylphosphinic acid, tolylphosphinic acid, xylylphosphinic acid, naphthylphosphinic acid, methylphosphinic acid, ethylphosphinic acid, propylphosphinic acid, n-butylphosphinic acid, t-butylphosphinic acid, isobutylphosphinic acid, amylphosphinic acid, hexylphosphinic acid, cyclohexylphosphinic acid, heptylphosphinic acid, octylphosphinic acid, cyclopentylphosphinic acid, hydroxymethylphosphinic acid, 2-hydroxyethylphosphinic acid, 2-hydroxypropylphosphinic acid, 3-hydroxypropylphosphinic acid, 3-hydroxycyclopentylphosphinic acid, 4-hydroxybutylphosphinic acid, 2-hydroxybutylphosphinic acid, 1-chlorobutylphosphinic acid, 2 - hydroxycyclopentylphosphinic acid, 5 - hydroxypentylphosphinic acid, 3-hydroxypentylphosphinic acid, 6-hydroxyhexylphosphinic acid, 4 - hydroxyhexylphosphinic acid, 2-hydroxycyclohexylphosphinic acid, 1-hydroxyhexylphosphinic acid, benzylphosphinic acid, p-chlorobenzylphosphinic acid, 1-naphthylmetylphosphinic acid, 2-cyano-1 - naphthylmethylphosphinic acid, choloromethylphosphinic acid, bromomethylphosphinic acid, 2-iodopentylphosphinic acid, 1-fluorohexylphosphinic acid, 2-cyanoethylphosphinic acid, 3-cyanopropylphosphinic acid, 1-cyanopropylphosphinic acid, 6-chlorohexylphosphinic acid, 4-bromobutylphosphinic acid, 3-carboxypropylphosphinic acid, 2-carboxyisopropylphosphinic acid, 1-carboxy-1-hydroxyamylphosphinic acid, 3 - carboxy - 2 - hydroxybutylphosphinic acid, 1 - carboxy - 1 - hydroxyethylphosphinic acid, 2-carboxy-1-hydroxyethylphosphinic acid, 2-carboxy-2-hydroxyethylphosphinic acid, 1-carboxy-1-hydroxypropylphosphinic acid, 3-carboxy-1-hydroxypropylphosphinic acid, 1-carboxyethylphosphinic acid, 2-carboxyethylphosphinic acid, 1-iodopropylphosphinic acid, 2-carboxypropylphosphinic acid, 3-carboxypropylphosphinic acid, 5-fluoropentylphosphinic acid, diphenylphosphinic acid, ditolylphosphinic acid, dixylyphosphinic acid, dinaphthylphosphinic acid, dimethylphosphinic acid, diethylphosphinic acid, dipropylphosphinic acid, di-n-butylphosphinic acid, di-t-butylphosphinic acid, diisobutylphosphinic acid, diamylphosphinic acid, dihexylphosphinic acid, dicyclohexylphosphinic acid, diheptylphosphinic acid, dioctylphosphinic acid, dicyclopentylphosphinic acid, bis-(chloromethyl)phosphinic acid, bis(2 - hydroxyethyl)phosphinic acid, bis(2-hydroxypropyl)phosphinic acid, bis(3-hydroxypropyl)phosphinic acid, dihydroxymethylphosphinic acid, bis(4-hydroxybutyl)phosphinic acid, bis(2-hydroxybutyl)phosphinic acid, bis(1 - hydroxybutyl)phosphinic acid, bis(2-hydroxycyclopentyl)phosphinic acid, bis(5-hydroxypentyl)phosphinic acid, bis(3-hydroxypentyl)phosphinic acid, bis(6-hydroxyhexyl)phosphinic acid, bis(4-hydroxyhexyl)phosphinic acid, bis(2 - hydroxycyclohexyl)phosphinic acid, bis(1-hydroxyhexyl)phosphinic acid, dibenzylphosphinic acid, bis(p - bromobenzyl)phosphinic acid, bis(1-naphthylmethyl)phosphinic acid, bis(2-cyanoethyl)phosphinic acid, bis(6-fluorohexyl)phosphinic acid, bis(3 - chlorohexyl)phosphinic acid, bis(p - cyanophenyl)phosphinic acid, bis(2 - bromoethyl)phosphinic acid, bis(3 - cyanopropyl)phosphinic acid, bis(1 - cyanopropyl)phosphinic acid, bis(1-carboxy-1-hydroxyethyl)phosphinic acid, bis(2 - carboxy - 1 - hydroxyethyl)phosphinic acid, bis(2 - carboxy - 2 - hydroxyethyl)phosphinic acid, bis(1-carboxy - 1 - hydroxypropyl)phosphinic acid, bis(3-carboxy-1-hydroxypropyl)phosphinic acid, bis(5-carboxy-5-hydroxyamyl)phosphinic acid, bis(1-carboxyethyl)phosphinic acid, bis(2-carboxyethyl)phosphinic acid, bis(1-carboxypropyl)phosphinic acid, bis(3 - carboxypropyl)phosphinic acid, methylpropylphosphinic acid, phenyltolylphosphinic acid, hydroxymethylpropylphosphinic acid, 1-hydroxybutyl-2-hydroxycyclohexylphosphinic acid, 2-cyanoethylphenylphosphinic acid, 1-naphthylmethyl - 1 - carboxy-1-hydroxyethylnaphthylphosphinic acid, 3 - hydroxybutyl-1-cyanoethylphosphinic acid, 1 - carboxy - 1 - hydroxypropyltolylphosphinic acid, hexylisobutylphosphinic acid, benzyloctylphosphinic acid, 2-hydroxyethyl-1-hydroxyethylphosphinic acid, methyl-3-hydroxybutylphosphinic acid, 2-carboxy - 2 - hydroxyethylphenylphosphinic acid, cyclohexyl-1-cyanoethylphosphinic acid, (3 - hydroxycyclopentyl)phenylphosphinic acid, (1-cyanoethyl)xylylphosphinic acid, ethyl-n-butylphosphinic acid, 2-carboxyethyl-1-chloromethylphosphinic acid, 2-carboxy-1-hydroxy-ethyl-2-cyanoethylphosphinic acid, and the like.

Any thermoplastic polymeric material may be rendered flame-retardant by the incorporation therewith of the above-identified flame-retardant combinations. Specifically, however, the vinyl type polymers, wherein a monomeric material is polymerized, by known methods, e.g. by use of free-radical generating catalysts, irradiation, anionic and cationic catalysts, etc., are those preferred. Examples of the vinyl type polymers which may be used to form my novel compositions are the polyvinyl acetates, polyvinylbutyral, butadiene copolymers, e.g. acrylonitrile-butadiene-styrene copolymers, the polyacrylonitriles, polybutadiene, polyaldehydes such as polyoxymethylene, and the like. Additionally and even more preferably, one may incorporate the flames-retardant synergistic combinations mentioned above into such polymers as the styrene polymers, i.e. polystyrene, α-methyl styrene polymers, etc. the α-olefin polymers, such as the homopolymers and copolymers etc. containing, as the major constituent thereof, ethylene, propylene, including polyethylene, polypropylene and the like and the acrylate and methacrylate homopolymers and copolymers produced from monomers having the formula (II)

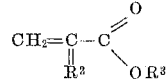

wherein $R^2$ is hydrogen or a methyl radical and $R^3$ is hydrogen or an alkyl radical having from 1 to 6 carbon atoms, inclusive. Examples of monomers represented by Formula II include acrylic acid, methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding alkyl methacrylates, etc.

Also such polymers as the nylons, e.g. adipic acid-hexamethylenediamine reaction products; the cellulosic such as cellulose acetate (and/or butyrate, etc.), cellulose nitrate; the polycarbonate, i.e. phosgene-Bisphenol A reaction products; the so-called impact polymers, i.e. rubber-polymer blends such as blends of polystyrene with 5–10% butadiene-styrene, etc. and the like may be made flame-retardant by the incorporation therein of the phosphinic acid-chlorinated hydrocarbon synergistic combinations discussed hereinabove.

Examples of other monomers which may be used to form the thermoplastic vinyl polymers encompassed by the present invention, polmyerized either singularly or in combination with each other or with the other compounds set forth hereinabove, are such monomers as the unsaturated ethers, e.g., ethyl vinyl ether, diallyl ether, etc , the unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; the unsaturated ketones, e.g., methyl vinyl ketone, methyl allyl ketone, etc.; methylene malonic esters, e.g., methylene methyl malonate, etc. and the like.

Other examples of polymers that may be employed are those of monomers set forth, for example, in U.S. Pat. No. 2,510,503, issued June 6, 1950.

The production of thermoplastic resin compositions which are flame-retardant is of considerable commercial importance in that such articles as castings, moldings, foamed or laminated articles, etc. are required, or at least desired, to be resistant to fire and flame and to possess the ability to endure heat without deterioration. Typical illustrations of applications of such compositions include castings for live electrical contacts which should not be ignited by flame or sparks, structural members such as pipes, wall coverings, wall paneling, windows, etc. and such items as ash trays, waste baskets, fibers and the like.

The novel flame-retardant combinations claimed herein may be added to the various polymers, as such, or as individual components, by any known method. That is to say, the flame-retardant components may be added to the polymer, as such, or in combination by (1) milling the polymer and the components on, for example, a two-roll mill, in a Banbury mixer, etc. by (2) molding the components and the polymer simultaneously, by (3) extruding the polymer and components or by (4) merely blending all the materials together in powder or liquid form and thereafter forming the desired ultimate product. Additionally, the flame-retardant may be added during the production of the polymer, i.e. during the monomer polymerization, provided, however, that the catalyst, etc. other conditions and other ingredients of the polymerization system are inert thereto.

It is also within the scope of the instant invention to incorporate such ingredients as plasticizers, dyes, pigments, heat and light stabilizers, antioxidants, antistatic agents, photochromic materials and the like into the flame-retarded polymer compositions claimed herein.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame-retardant properties of any specific combination of phosphinic acid and chlorined hydrocarbon material. One test I have found to be reasonably efficient is a modified version of that test identified as ASTM-D-635-56T. The specifications of this test are: a specimen, 5" in length, 0.5" in width and 0.045" in thickness is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is put in contact with the strip. At the end of 30 seconds, the flame is removed and the specimen is allowed to burn. If the specimen does not continue to burn after the first ignition, it is immediately recontacted with the burner for another 30 seconds. If, after the two burnings, the strip is not burned to the 4" mark, the specimen is designated as "self-extinguishing." If the specimen is not burned to the 1" mark it is designated as "non-burning." In the modified test, the specimen is 20 mils in thickness rather than the prescribed 0.045".

EXAMPLE 1

To 100 parts of polypropylene are added 3 parts of dicyclohexyl phosphinic acid and 2 parts of chlorinated paraffin wax containing 70% chemically combined chlorine (empirical formula $C_{24}H_{29}Cl_{21}$). The resultant mixture is placed in a suitable blender and dry-blended for 10 minutes. The blended product is then transferred to a melt-index apparatus (see ASTM-D-1238-62T) which is preheated to 250° C. Following one minute of aging, a 2.2 kg. weight is placed on the plunger and an extrudate of 6–8 inches in length is obtained. This specimen is marked and tested according to the above-enumerated flame-retardance test. The results are set forth in Table I, below.

Various other flame-retardant combinations are then incorporated into various other resins according to Example 1 and comparisons are made between the resultant compositions and control compositions. These results are also set forth in Table I, below. In the table, the term "passed" means the specimen was either "non-burning" or "self-extinguishing" and the term "failed" means the specimen was "free-burning."

TABLE I

| Example | Phosphinic acid R | Phosphinic acid R¹ | Percent | Chlorinated hydrocarbon | Percent | Polymer | Flame-test results |
|---|---|---|---|---|---|---|---|
| 1 | Cyclohexyl | Cyclohexyl | 3 | Chlorinated paraffin wax-70% combined chlorine. | 2 | Polypropylene | Passed. |
| 2 | do | do | 15 | | | do | Failed. |
| 3 | | | | Same as Example 1 | 15 | do | Do. |
| 4 | Phenyl | Hydrogen | 2 | do | 2 | do | Passed. |
| 5 | do | do | 15 | | | do | Failed. |
| 6 | 2-hydroxybenzyl | 2-hydroxybenzyl | 5 | Same as Example 1 | 5 | do | Passed. |
| 7 | do | do | 15 | | | do | Failed. |
| 8 | Phenyl | Phenyl | 5 | Same as Example 1 | 5 | do | Passed. |
| 9 | do | do | 10 | | | do | Failed. |
| 10 | Hydroxymethyl | Hydroxymethyl | 5 | Same as Example 1 | 5 | do | Passed. |
| 11 | do | do | 10 | | | do | Failed. |
| 12 | o,p-Dichlorobenzyl | Hydrogen | 5 | Same as Example 1 | 5 | do | Passed. |
| 13 | do | do | 15 | | | do | Failed. |
| 14 | Cyclohexyl | Cyclohexyl | 2 | Same as Example 1 | 2 | Polyethylene | Passed. |
| 15 | do | do | 4 | | | do | Failed. |
| 16 | | | | Same as Example 1 | 4 | do | Do. |
| 17 | Cyclohexyl | Cyclohexyl | 2 | do | 2 | Polystyrene | Passed. |
| 18 | do | do | 5 | | | do | Failed. |
| 19 | | | | Same as Example 1 | 5 | do | Do. |
| 20 | Phenyl | Hydrogen | 2 | do | 2 | do | Passed. |
| 21 | do | do | 5 | | | do | Failed. |
| 22 | o-Chlorobenzyl | do | 5 | Perchloropentacyclodecane | 5 | Polypropylene | Passed. |
| 23 | do | do | 15 | | | do | Failed. |
| 24 | | | | Same as Example 22 | 15 | do | Do. |
| 25 | Octyl | Hydrogen | 3 | Hexachlorobenzene | 3 | Polystyrene | Passed. |
| 26 | do | do | 20 | | | do | Failed. |
| 27 | | | | Same as Example 25 | 20 | do | Do. |
| 28 | Methyl | Naphthyl | 5 | Clear polyphenyl resin distills 280–335° C., softens 98–105.5° C. | 5 | Poly(methyl methacrylate). | Passed. |
| 29 | do | do | 10 | | | do | Failed. |
| 30 | | | | Same as Example 28 | 10 | do | Do. |
| 31 | 6-bromohexyl | 6-bromohexyl | 4.5 | Hexachlorocyclopentadiene | 4.5 | Polypropylene | Passed. |
| 32 | do | do | 9 | | | do | Failed. |
| 33 | | | | Same as Example 31 | 9 | do | Do. |
| 34 | 2-cyanoethyl | 2-cyanoethyl | 2 | Chlorinated paraffin wax-50% combined chlorine. | 2 | Polyoxymethylene | Passed. |
| 35 | do | do | 10 | | | do | Failed. |
| 36 | | | | Same as Example 34 | 10 | do | Do. |
| 37 | 2-cyanopropyl | 2-cyanopropyl | 5 | 2,3,5,6-tetrachloro-p-xylene | 5 | Cellulose acetate | Passed. |
| 38 | do | do | 10 | | | do | Failed. |
| 39 | | | | Same as Example 37 | 10 | do | Do. |
| 40 | 1-hydroxyhexyl | Phenyl | 3 | Yellow, viscous polyphenyl oil distills 365–390° C.—pours 10° C., refractive index ¹ 1.639–1.641. | 3 | Low-density polyethylene. | Passed. |

See footnote at end of table.

TABLE I.—Continued

| | Phosphinic acid | | Percent | Chlorinated hydrocarbon | Percent | Polymer | Flame-test results |
|---|---|---|---|---|---|---|---|
| | R | R¹ | | | | | |
| 41 | do | do | 15 | do | | do | Failed |
| 42 | | | | Same as Example 40 | 15 | do | Do. |
| 43 | 2-hydroxyethyl | Benzyl | 2.5 | α,α-Dichloro-m-xylene | 2.5 | Polyvinylbutyral | Passed |
| 44 | do | do | 8 | | | do | Failed |
| 45 | | | | Same as Example 43 | 8 | do | Do. |
| 46 | 2-carboxyethyl | 2-carboxyethyl | 6 | White polyphenyl powder—distills 435-450° C.—softens 150-170° C. | 6 | Nylon | Passed |
| 47 | do | do | 15 | | | do | Failed |
| 48 | | | | Same as Example 46 | 15 | do | Do. |
| 49 | 2-carboxypropyl | 2-carboxypropyl | 7.5 | Chlorinated paraffin wax-40% combined chlorine. | 7.5 | Butadiene/styrene 25/75. | Passed |
| 50 | do | do | 20 | | | do | Failed |
| 51 | | | | Same as Example 49 | 20 | do | Do. |
| 52 | 1-hydroxy-1-carboxyethyl. | 1-hydroxy-1-carboxyethyl. | 5 | Same as Example 1 | 5 | Polyethylene | Passed |
| 53 | do | do | 10 | | | do | Failed |
| 54 | 1-hydroxy-1-methyl-3-carboxypropyl. | 1-hydroxy-1-methyl-3-carboxypropyl. | 5 | Same as Example 22 | 5 | Polypropylene | Passed |
| 55 | do | do | 15 | | | do | Failed |
| 56 | 1-naphthylmethyl | 1-naphthylmethyl | 5 | Same as Example 25 | 5 | Polystyrene | Passed |
| 57 | do | do | 10 | | | do | Failed |
| 58 | Chloromethyl | Benzyl | 4 | Same as Example 31 | 4 | Polypropylene | Passed |
| 59 | do | do | 10 | | | do | Failed |
| 60 | p-Chlorophenyl | Hydrogen | 7.5 | Same as Example 22 | 7.5 | do | Passed |
| 61 | do | do | 15 | | | do | Failed |
| 62 | Methyl | Methyl | 5 | Same as Example 34 | 5 | Polyoxymethylene | Passed |
| 63 | do | do | 10 | | | do | Failed |
| 64 | Octyl | Octyl | 7 | Same as Example 25 | 3.5 | Polystyrene | Passed |
| 65 | do | do | 13 | | | do | Failed |
| 66 | Bromomethyl | Bromomethyl | 2 | Same as Example 40 | 8 | Polyethylene | Passed |
| 67 | do | do | 10 | | | do | Failed |
| 68 | 6-hydroxyhexyl | 6-hydroxyhexyl | 5 | Same as Example 1 | 5 | Polypropylene | Passed |
| 69 | do | do | 10 | | | do | Failed |

¹ D-line at 20° C.
² Adipic acid-hexamethylenediamine reaction product.

I claim:

1. A flame-retarded composition comprising a thermoplastic polymer selected from the group consisting of vinyl polymers, nylons, cellulosic resins and polycarbonates having incorporated therein a combination of (1) from about 2.0% to about 15.0%, by weight, based on the weight of said polymer, of a chlorinated hydrocarbon containing from about 40 to 80% of combined chlorine and having a boiling point of at least 200° C. and (2) from about 2.0% to about 15.0%, by weight, same basis, of a phosphinic acid having the formula

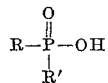

wherein R is selected from the group consisting of aryl ($C_6$–$C_{10}$), alkyl ($C_1$–$C_8$), aralkyl ($C_7$–$C_{11}$), cyanoalkyl ($C_3$–$C_4$), hydroxyalkyl ($C_1$–$C_6$), haloalkyl ($C_1$–$C_6$), carboxyalkyl ($C_3$–$C_4$) and carboxyhydroxyalkyl ($C_3$–$C_6$) radicals and $R^1$ is selected from the group consisting of hydrogen and R, the sum of the amounts of components (1) and (2) being less than those amounts at which both of said components function independently in a manner similar to the combination in the same polymer to which the combination is added.

2. A flame-retardant composition according to claim 1 wherein (2) is dicyclohexyl phosphinic acid.

3. A flame-retardant composition according to claim 1 wherein (2) is phenyl phosphonic acid.

4. A flame-retardant composition according to claim 1 wherein (1) is a chlorinated paraffin wax.

5. A flame-retardant composition according to claim 1 wherein (1) is a polychlorinated cyclic hydrocarbon.

6. A flame-retarded composition according to claim 1 wherein said thermoplastic polymer is a polyolefin.

7. A flame-retarded composition according to claim 1 wherein said thermoplastic polymer is polyethylene.

8. A flame-retarded composition according to claim 1 wherein said thermoplastic polymer is polypropylene.

9. A flame-retarded composition according to claim 1 wherein said thermoplastic polymer is polystyrene.

10. A flame-retarded composition according to claim 6 wherein said polymer is polypropylene, said (1) is a chlorinated paraffin wax and said (2) is dicyclohexyl phosphonic acid.

References Cited

UNITED STATES PATENTS 3,269,963  8/1966  Ilgemann ......... 260—28.5A
3,322,716  5/1967  Klein ............. 260—45.7P MORRIS LIEBMAN, Primary Examiner P. R. MICHL, Assistant Examiner U.S. Cl. X.R.

106—15; 260—33.8, 45.7, 28